United States Patent
Wengelnik et al.

(10) Patent No.: US 10,261,653 B2
(45) Date of Patent: Apr. 16, 2019

(54) METHOD AND DEVICE FOR MAKING AVAILABLE A USER INTERFACE, IN PARTICULAR IN A VEHICLE

(75) Inventors: Heino Wengelnik, Wolfsburg (DE); Mathias Kuhn, Berlin (DE); Gustav Hofmann, Braunschweig (DE); Andreas Medler, Lengede (DE); Frank Althoff, Lehrte (DE)

(73) Assignee: VOLKSWAGEN AG, Wolfsburg (DE)

( * ) Notice: Subject to any disclaimer, the term of this patent is extended or adjusted under 35 U.S.C. 154(b) by 173 days.

(21) Appl. No.: 14/342,324

(22) PCT Filed: Aug. 28, 2012

(86) PCT No.: PCT/EP2012/003602
§ 371 (c)(1),
(2), (4) Date: Feb. 28, 2014

(87) PCT Pub. No.: WO2013/029773
PCT Pub. Date: Mar. 7, 2013

(65) Prior Publication Data
US 2014/0215403 A1 Jul. 31, 2014

(30) Foreign Application Priority Data
Sep. 3, 2011 (DE) .......... 10 2011 112 448

(51) Int. Cl.
*G06F 3/0481* (2013.01)
*B60K 35/00* (2006.01)
(Continued)

(52) U.S. Cl.
CPC .......... *G06F 3/04815* (2013.01); *B60K 35/00* (2013.01); *G06F 3/017* (2013.01);
(Continued)

(58) Field of Classification Search
CPC ............ G02B 27/22; B60K 2350/1028; B60K 2350/00; B60K 2350/1004; G03H 1/26;
(Continued)

(56) References Cited

U.S. PATENT DOCUMENTS 8,826,184 B2 * 9/2014 Kwak .................... G06F 3/0488
715/757
9,377,860 B1 * 6/2016 Weber ..................... G06F 3/017
(Continued)

FOREIGN PATENT DOCUMENTS

CN 101010661 A 8/2007
DE 3740557 A1 6/1989
(Continued)

OTHER PUBLICATIONS

Search Report for International Patent Application No. PCT/EP2012/003602; dated Feb. 12, 2013.
(Continued)

*Primary Examiner* — Shen Shiau
(74) *Attorney, Agent, or Firm* — Barnes & Thornburg LLP

(57) ABSTRACT

A method for making available a user interface, in particular in a vehicle, in which one or more graphic objects are displayed on a display with a touch-sensitive surface, an operator controlled intention which can be assigned to an operator controlled area of the display is determined in a contactless fashion in a space in the viewing direction in front of the display, and an operator controlled action is implemented by touching one of the graphic objects in the operator-controlled area of the display. Three-dimensional graphics data are calculated for a graphic object in the operator-controlled area of the display, and that when the operator-controlled intention has been determined, the graphic object in the operator-controlled area is emphasized
(Continued)

visually in that the display of the graphic object which can be perceived over an area in the plane of the display is changed into a display which can be perceived spatially.

14 Claims, 4 Drawing Sheets

(51) Int. Cl.
  *G06F 3/0488* (2013.01)
  *G06F 3/01* (2006.01)
  *G06F 3/0482* (2013.01)
  *G06F 3/0484* (2013.01)
  *G02B 27/22* (2018.01)
  *G03H 1/26* (2006.01)

(52) U.S. Cl.
  CPC .......... *G06F 3/0482* (2013.01); *G06F 3/0488* (2013.01); *G06F 3/04842* (2013.01); *B60K 2350/1004* (2013.01); *B60K 2350/1012* (2013.01); *B60K 2350/1028* (2013.01); *B60K 2350/2017* (2013.01); *G02B 27/22* (2013.01); *G03H 1/26* (2013.01); *G06F 2203/04101* (2013.01)

(58) Field of Classification Search
  CPC ..... G03H 1/02; G06F 3/04815; G06F 3/0482; G06F 3/0488; G06F 3/017; G06F 3/04842
  See application file for complete search history.

(56) References Cited

U.S. PATENT DOCUMENTS

| | | | |
|---|---|---|---|
| 2007/0165027 A1* | 7/2007 | Nakadaira | G02B 27/2278 345/426 |
| 2009/0210110 A1 | 8/2009 | Dybalski et al. | |
| 2011/0188780 A1* | 8/2011 | Wang | G06T 7/0059 382/293 |
| 2011/0224897 A1* | 9/2011 | Tan | G01C 21/3664 701/532 |
| 2011/0225538 A1* | 9/2011 | Oyagi | G06F 1/1692 715/781 |
| 2011/0246877 A1* | 10/2011 | Kwak | G06F 3/0488 715/702 |
| 2011/0310048 A1* | 12/2011 | B.R | G06F 3/04817 345/173 |
| 2011/0320969 A1* | 12/2011 | Hwang | G06F 1/1626 715/765 |
| 2012/0001843 A1* | 1/2012 | Gravino | G06F 1/1694 345/156 |
| 2012/0050478 A1* | 3/2012 | Karaoguz | H04N 13/111 348/46 |
| 2012/0108328 A1* | 5/2012 | Konno | H04N 13/0022 463/31 |
| 2012/0192121 A1* | 7/2012 | Bonnat | G06F 3/0488 715/863 |
| 2013/0212487 A1* | 8/2013 | Cote | G06F 9/451 715/745 |
| 2015/0033174 A1* | 1/2015 | Hisatsugu | B60K 37/06 715/771 |
| 2015/0161836 A1* | 6/2015 | Park | G07C 9/00134 340/5.51 |

FOREIGN PATENT DOCUMENTS

| | | |
|---|---|---|
| DE | 19704740 A1 | 8/1998 |
| DE | 102008034507 A1 | 1/2010 |
| DE | 102008050803 A1 | 4/2010 |
| DE | 102008052485 A1 | 4/2010 |
| DE | 102009048834 A1 | 4/2011 |
| DE | 102009051202 A1 | 5/2011 |
| EP | 0891887 A1 | 1/1999 |
| GB | 2212964 A | 8/1989 |
| JP | 2006031499 A | 2/2006 |
| JP | 2006072854 A | 3/2006 |
| JP | 2008234594 A | 10/2008 |
| WO | 2006127378 A1 | 11/2006 |

OTHER PUBLICATIONS

Office Action for Korean Patent Application No. 10-2014-7008807; dated Mar. 16, 2015.

\* cited by examiner

METHOD AND DEVICE FOR MAKING AVAILABLE A USER INTERFACE, IN PARTICULAR IN A VEHICLE

PRIORITY CLAIM

This patent application is a U.S. National Phase of International Patent Application No. PCT/EP2012/003602, filed 28 Aug. 2012, which claims priority to German Patent Application No. 10 2011 112 448.2, filed 3 Sep. 2011, the disclosures of which are incorporated herein by reference in their entirety.

SUMMARY

The present disclosure relates to a method for providing a user interface, particularly in a vehicle, in which one or more graphical objects are presented on a display panel having a touch-sensitive surface, an operating intention that can be attributed to an operating area of the display panel is contactlessly sensed in a space in the direction of view in front of the display panel, and an operator action is performed by touching one of the graphical objects in the operating area of the display panel. Furthermore, the present disclosure relates to an associated apparatus for providing a user interface and to a vehicle having such a user interface.

BRIEF DESCRIPTION OF THE DRAWINGS

Illustrative embodiments are now explained in more detail using disclosed embodiments with reference to the figures.

DETAILED DESCRIPTION OF THE DISCLOSED EMBODIMENTS

Figure 1:
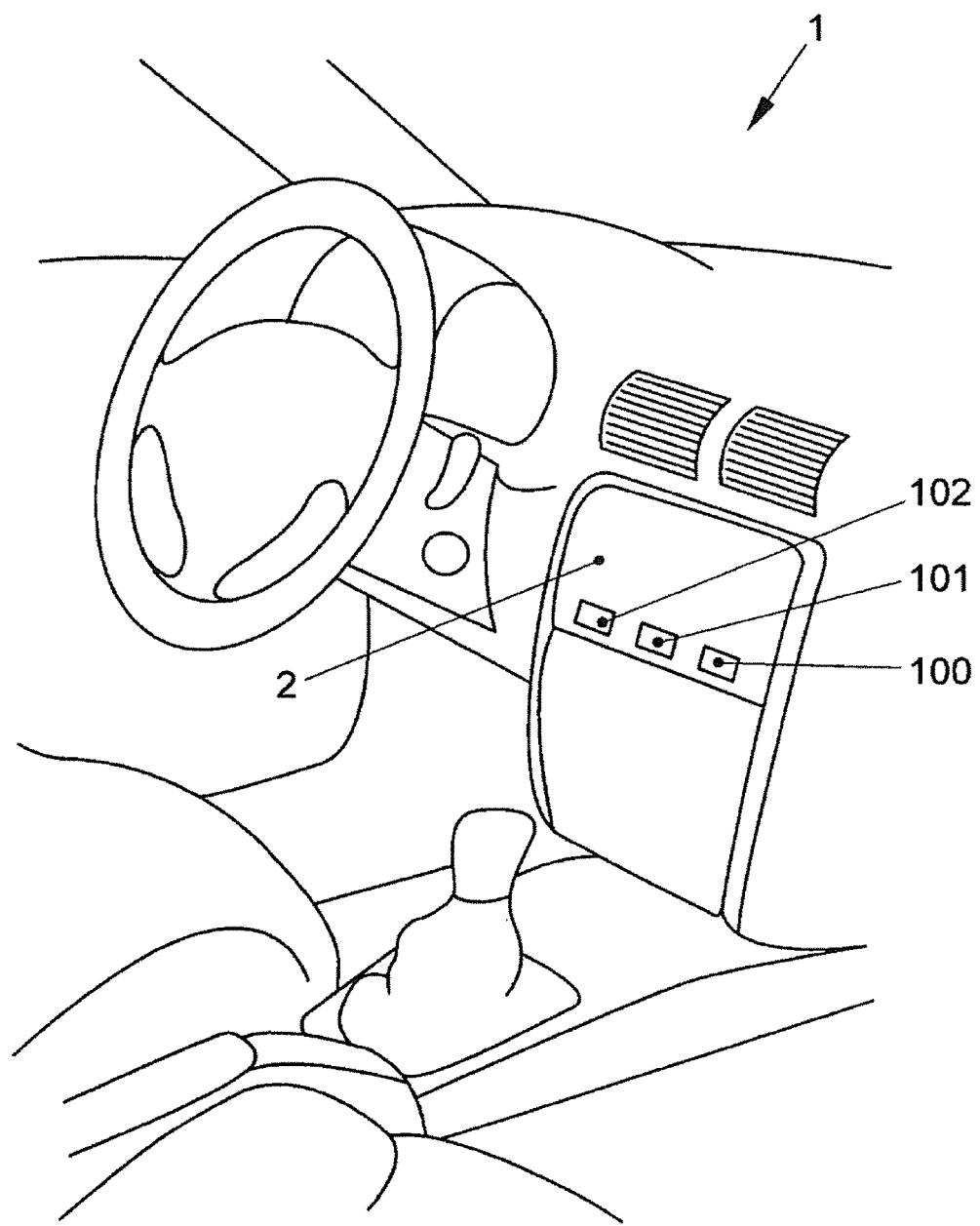
FIG. 1 shows a cockpit in a vehicle in which an apparatus for providing a user interface is arranged.

Illustrative embodiments provide a method and an associated apparatus of the type cited at the outset that increases the convenience of operation of the user interface, particularly for use in a vehicle, and can reduce the risk of incorrect inputs.

According to the disclosed method, three-dimensional graphics data are calculated for a graphical object in the operating area of the display panel, and in that when the operating intention has been sensed, the graphical object in the area of operation is visually highlighted area by converting it from a two-dimensionally perceptible presentation in the plane of the display panel into a three-dimensionally perceptible presentation. The change from two-dimensional to three-dimensional perceptibility first of all draws the attention of the user to the thus altered graphical object.

Furthermore, such a change allows the user to intuitively recognize that the system has actually recognized an operating intention for the relevant operating area. The conversion from a two-dimensional to a three-dimensionally perceptible presentation of an operating area, in which possibly a plurality of graphical objects altered in this manner are displayed, can be vaguely perceived by the user as a whole even when the user has not yet visually focused on this operating area. The method is, therefore, particularly well suited to changing over from a display mode to an operating mode in a vehicle in which the driver can avert his view from what is happening in the traffic only for as short a period as possible in the event of operator actions.

The conversion from a two-dimensional to a three-dimensionally perceptible presentation can take place in various ways. The basis for this is always the prior calculation of three-dimensional graphics data. It is not necessary for the whole graphical object to be completely three-dimensionally perceptible, but rather only a portion of the object as appropriate. By way of example, only a border or a frame of the graphical object is displayed in three-dimensionally perceptible form or the associated three-dimensional graphics data are calculated.

In at least one disclosed embodiment of the method, secondary graphics data for a perspective two-dimensional presentation are calculated from the three-dimensionally calculated graphics data, and the graphical object is presented in two-dimensionally perspective form on the basis of the secondary graphics data. This presentation can be calculated even with processors having relatively low power and can be presented on relatively simple displays, which means that it is also possible for older hardware versions to be used for the method if need be. A two-dimensionally perspective presentation can easily be produced in a manner that is intuitive for the user to grasp, e.g. as an edge or shadow.

Provision may also be made for the display panel to comprise at least two display planes that are situated behind one another in three dimensions for the three-dimensional perceptibility of the graphical object and for at least two different image points from the visually highlighted graphical object to be presented in different display planes. This may be advantageous for projection methods in which images can be projected onto at least one of the display planes, for example.

In a further disclosed embodiment, the calculation of the three-dimensional graphics data comprises the calculation of a plurality of stereoscopic views of the graphical object, and the visually highlighted graphical object is presented in stereoscopic form. The use of what are known as autostereoscopic display panels allows this disclosed embodiment to be easily used.

In contrast to perspective two-dimensional presentations, autostereoscopic display apparatuses involve one eye seeing a slightly different image than the other eye. This achieves real three-dimensional presentation. To this end, slightly different images are calculated for different angles of view. The number of images calculated in this manner is at least two, but may also be greater than twenty in known systems. Typically, five to nine views are a good compromise between requirement of computation power and image quality. No special apparatuses, such as glasses or the like, are necessary for an autostereoscopic display to bring about the three-dimensional effect when viewing the display. Autostereoscopic display apparatuses are disclosed in DE 102 25 385 A1 and in DE 10 2005 017 313 A1, for example.

As an alternative to an autostereoscopic presentation, it is also possible to use other three-dimensional presentations, e.g. holographic displays. These are described in DE 37 40 557 A1, DE 197 04 740 A1, GB 2 212 964 A and in EP 0 891 887 B1, for example.

In the case of all the disclosed embodiments described herein, provision may be made for the transition from the two-dimensionally perceptible presentation to the three-dimensionally perceptible presentation to take place in a plurality of intermediate stages. Such animation allows the attention of the user to be directed at the operating area to which the operating intention has been attributed to an even greater degree.

In this case, the intermediate stages may be embodied differently in terms of timing and scope. In particular, they may be completed in a period that is so short that it is impossible for an operator action to be performed by touching an operable graphical object in the operating area on the display panel. By way of example, the operating intention is sensed in such timely fashion and the intermediate stages are displayed in such quick succession that, by way of example, the operating hand of the user could not have reached the operating area of the display panel. Alternatively, the animation can be performed for a relatively long period, as a result of which the user, if interrupted during an input, continues to have his attention drawn to the operating area. In particular, it is possible to animate raising or lowering of buttons with a three-dimensional effect or the rotation of an object in space.

In a disclosed embodiment of the method, a plurality of objects in the operating area are each attributed to a different class, and the visual alteration is performed on the basis of the attributed class. Such distinction into various classes allows the user to be provided with even better guidance for a possible or probable user input if need be.

In this case, it is particularly possible to ascertain whether the graphical object in the operating area is operable during the sensing of the operating intention, and to visually alter the graphical object on the basis of operability. This makes it possible to prevent a user from making a vain attempt to operate objects that are inoperable in a given context or in the first place. The operator action can be speeded up by specific leading to the operable objects. This contributes to driving safety when the user is the driver.

An operable object in the operating area can be visually highlighted such that it is perceived with a three-dimensional alteration in the direction of view. Alternatively or else in addition, an inoperable object in the operating area can be visually altered such that it is perceived with a three-dimensional alteration in a direction away from the direction of view. Such a presentation can be perceived in particularly intuitive fashion, even if the user cannot view the display panel with undivided attention.

The contactless sensing of the operating intention in the space in the direction of view in front of the display panel can be effected using a three-dimensionally resolving proximity sensing unit, for example, particularly using a light barrier and/or using a camera system. This allows good resolution of the space in front of the display panel, and the graphics data can then be calculated in three-dimensional form on the basis of this three-dimensional resolution. Alternatively, the contactless sensing of the operating intention can also be effected by capacitive sensing or sensing of the direction of view of the user.

The calculation of the three-dimensional graphics data for the visually highlighted graphical object may be in a perspective relationship with the space in front of the display panel in which the operating intention has been contactlessly sensed. This allows very realistic operating processes to be attained in which the movement of the user's hand when the operating intention is being recognized is extended linearly in relation to the operable objects in the operating area, so that the user's hand approaches said objects virtually, for example.

The disclosed apparatus for providing a user interface, particularly in a vehicle, comprises a display panel having a touch-sensitive surface for presenting graphical objects and for sensing an operator action by virtue of one of the graphical objects being touched and also a sensing device for contactlessly sensing an operating intention in a space in the direction of view in front of the display panel. Furthermore, it comprises a control unit that is connected to the display panel and to the sensing device and by means of which the space in which an operating intention has been sensed can be attributed to an operating area on the display panel. According to the disclosed apparatus, the control unit can be used to calculate three-dimensional graphics data for a graphical object and in that the graphical object in the operating area is visually highlightable by virtue of said graphical object being able to be converted from a two-dimensionally perceptible presentation into a three-dimensionally perceptible presentation when the operating intention has been sensed. The apparatus for providing a user interface is particularly suited to performing the disclosed method. Hence, it also has the advantages of the disclosed method.

By way of example, the proximity sensing device may comprise a reflection light barrier that comprises at least one illuminant for emitting electromagnetic detection radiation into the detection area and a reception element for detecting a share of the detection radiation that is scattered and/or reflected by the operating element, e.g. the finger of the user. In particular, it may be designed to recognize the operating element in the detection area from the intensity of the received detection radiation. In addition, the proximity sensing device may comprise various illuminants for individual zones in the detection area that each emit electromagnetic detection radiation into the respective zone. In addition, a modulation apparatus for modulating the emitted detection radiation may be provided, as a result of which the detection radiation that is emitted into the individual zones differs in terms of its modulation in each case. In this case, the proximity sensing device may also comprise an analysis unit that is designed such that the received reflected and/or scattered detection radiation can be analyzed in terms of its modulation to ascertain the zone in which the detection radiation has been scattered or reflected by an operating element. In particular, the detection zones can extend parallel to an arrangement of operator elements. However, the detection zones are distinguished in respect of the distance from the operator elements in a direction perpendicular thereto. The proximity sensing device can therefore be used to determine the residence of an operating element separately for each zone, as a result of which it is a simple matter to ascertain the distance of the operating element from the operator elements.

A vehicle is furthermore equipped with such an apparatus for providing a user interface.

The apparatus and the method are explained below using at least one disclosed embodiment for a user interface in a vehicle. However, it is pointed out that the user interface can also be used in the same way for other devices for displaying information and for controlling associated functions.

FIG. 1 shows a cockpit in a vehicle 1 in which a display panel having a touch-sensitive surface, what is known as a touchscreen 2, is arranged in the upper area of the central console, so that graphical objects 100-102 shown on the touchscreen 2 can be easily viewed and, if need be, operated by the driver and the front-seat passenger. The touchscreen 2 may also be arranged at another suitable position.

Figure 2:
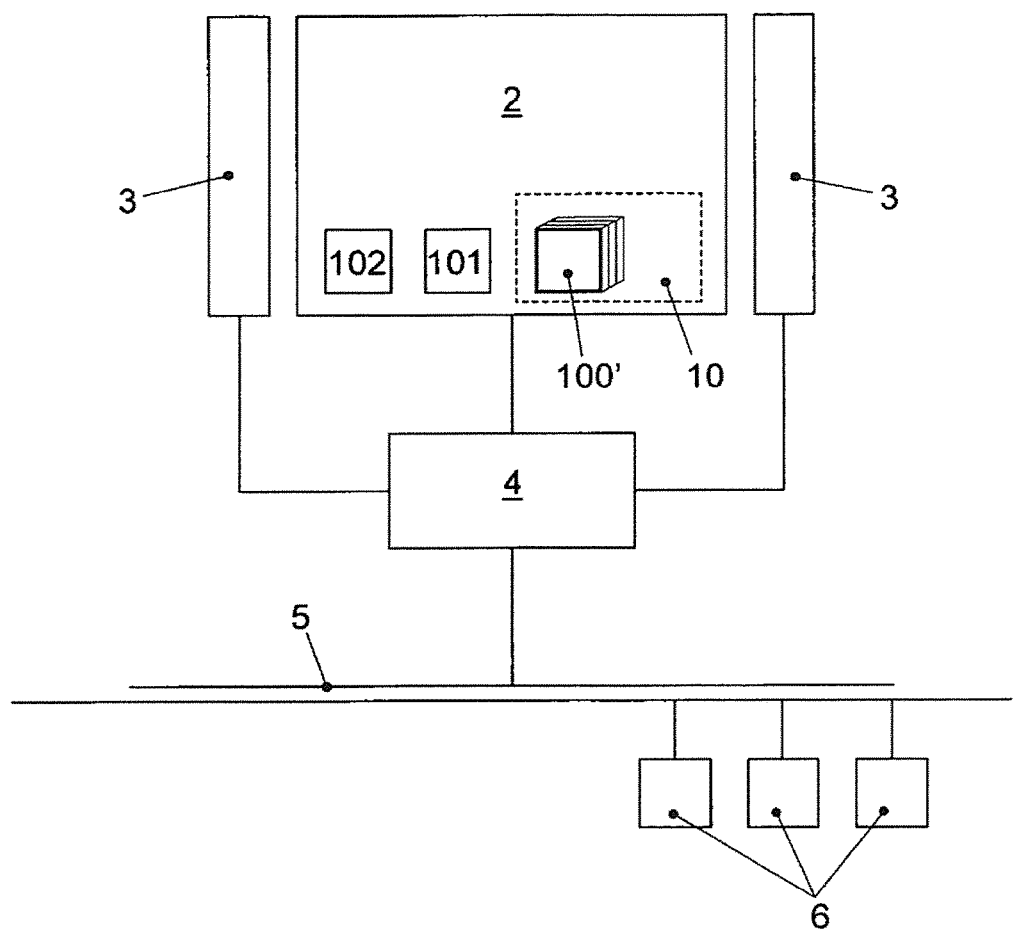
FIG. 2 schematically shows the design of a disclosed embodiment of an apparatus for providing a user interface.

The touchscreen 2 is part of an apparatus for providing a user interface, the design of which is shown briefly in FIG. 2 using an illustrative embodiment. Arranged next to the touchscreen 2 is a proximity sensing device 3 that monitors a space in the direction of view in front of the touchscreen 2. The proximity sensing device 3 can be used to contactlessly sense particularly an operating intention attributed to an operating area 10 on the touchscreen 2, for example by detecting an article that enters the space in front of the touchscreen 2 for the purpose of operating the graphical interface of the touchscreen 2, e.g. the finger of the user. By way of example, the proximity sensing device is a zonally resolving infrared light barrier that is known per se.

The touchscreen 2 and the proximity sensing device 3 are connected to a control unit 4. In addition, the control unit 4 is connected via the data bus 5 in the vehicle to various functional devices 6 that provide data pertaining to the graphical objects 100-102 and the executable functions of which are able to be controlled via the graphical user interface. By way of example, the functional devices 6 comprise a navigation appliance, driver assistance systems, infotainment devices, e.g. for reproducing information or for playing back music or entertainment programs, and also vehicle comfort devices, particularly for setting the air-conditioning system in the vehicle 1.

The control unit 4 receives the signals from the proximity sensing device 3 and evaluates them by attributing an operating area 10 to an operating intention. This attribution can take place in various ways that are known per se. By way of example, the entry of the finger 11 of the user into a zone in front of the touchscreen 2 is sensed and the area of the touchscreen 2 that is situated behind that in the direction of view is interpreted as an operating area 10. The attribution can also take place such that an operating intention is attributed from the movement of a sensed article for that operating area 10 that extends around the point of intersection that is obtained from the extended line of the direction of movement with the surface of the touchscreen 2.

When an operating intention is recognized, the graphical object displayed in the operating area 10 is then visually highlighted by calculating three-dimensional graphics data for the graphical object and converting the graphical object from a two-dimensionally perceptible presentation 100 into a three-dimensionally perceptible presentation 100', as will be explained in more detail further below with reference to FIGS. 3A-5E in connection with the method.

The method will now be described in more detail using illustrative embodiments with reference to FIGS. 3A-5E. To this end, the apparatus for providing a user interface that is described with reference to FIGS. 1 and 2 can be used.

Figure 3A:
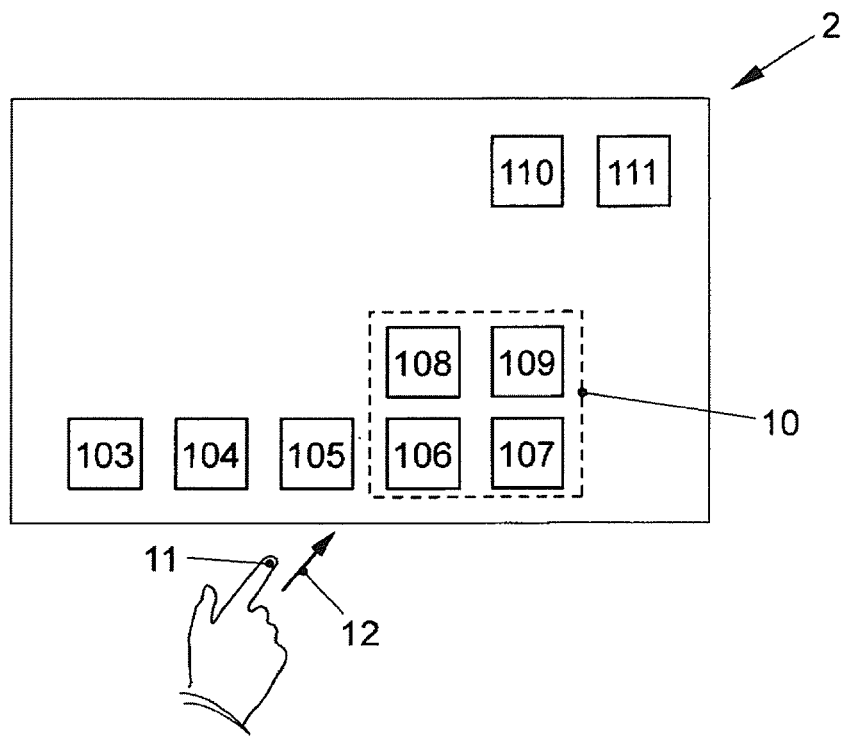
FIGS. 3A-3B schematically show graphical objects on a display panel that have been altered from a two-dimensionally perceptible to a three-dimensionally perceptible presentation in accordance with a disclosed embodiment of the method.
Figure 3B:
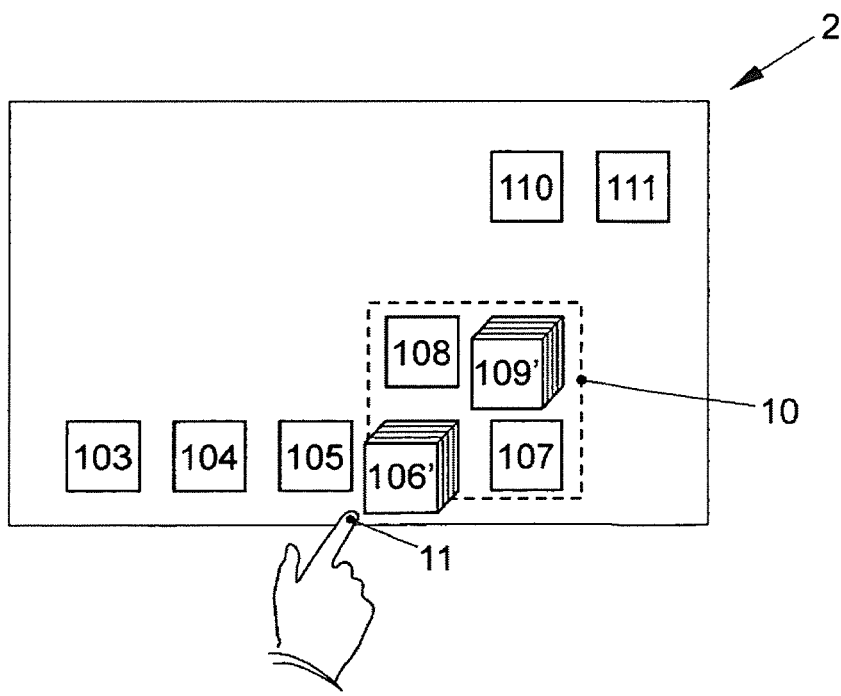

FIGS. 3A-3B show the beginning of an operating process in which a user would like to operate a functional device 6 via the graphical user interface. A multiplicity of graphical objects are displayed to the user in a two-dimensionally perceptible presentation 103-111. First, a general operating intention is recognized when the finger 11 of the user enters the detection zone in front of the touchscreen 2. A plurality of sensing operations, taking place at successive times, for the position of the finger 11 allow a direction of operation 12 to be ascertained, as shown in FIG. 3A.

An operating area 10 attributed to the operating intention is ascertained from the direction of operation 12. The graphical objects presented in this operating area 10 are now classified into different classes, specifically at least on the basis of the criterion of whether or not the relevant graphical object is operable in the present operating situation. Three-dimensional graphics data are then calculated for the operable graphical objects 106, 109 and are converted from the two-dimensionally perceptible presentation into a three-dimensionally perceptible presentation 106', 109', as shown in FIG. 3B.

To attain the three-dimensionally perceptible presentation, at least one disclosed embodiment allows secondary graphics data for a perspective two-dimensional presentation to be calculated from the three-dimensional graphics data, and the relevant graphical object to be presented in two-dimensionally perspective form on the basis of the secondary graphics data, as a result of which a three-dimensionally perceptible presentation arises for the human eye. Alternatively, however, it is also possible to use real three-dimensional presentations, such as stereoscopic, autostereoscopic or holographic image production. In a further disclosed embodiment, a three-dimensionally perceptible presentation can also be obtained by virtue of partial images of the graphical object each being produced on at least semitransparent surfaces situated in succession in the direction of view. By way of example, this may involve a conventional graphical display having a first image plane for presenting a first partial image and a semitransparent plate situated above the latter, onto which a further partial image can be projected.

In at least one disclosed embodiment of the method, the graphical objects 107, 108 that are inoperable in the specific situation are presented in two-dimensional form without alteration. In another disclosed embodiment in this regard, the inoperable graphical objects are graphically altered in another manner. Different variants for converting two-dimensionally perceptible presentations into three-dimensionally perceptible presentations are illustrated below with reference to FIGS. 4A-4E and 5A-5E. In this case, FIGS. 4A-4E show the two-dimensionally perceptible presentations and FIGS. 5A-5E show the associated three-dimensionally perceptible presentations.

Figure 4A:
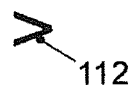
FIGS. 4A-4E show various two-dimensionally perceptible graphical objects.
Figure 5A:
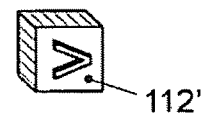
FIGS. 5A-5E show the graphical objects from FIGS. 4A-4E that have been altered from a two-dimensionally perceptible to a three-dimensionally perceptible presentation in accordance with disclosed embodiments of the method.

In FIG. 4A, the graphical object from the two-dimensionally perceptible presentation 112 is altered such that it stands out from the display plane into a three-dimensionally perceptible presentation 112' (FIG. 5A). In this case, the direction in which the three-dimensionally perceptible presentation 112' stands out may be the same as the direction of operation 12, so that the graphical object appears to approach the operating finger as a result of the operating intention being recognized.

Figure 4B:
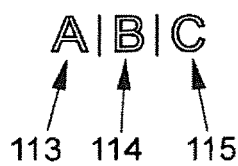
Figure 5B:
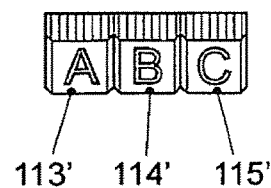

FIG. 4B is a two-dimensional illustration of a plurality of graphical objects 113-115 displayed next to one another. During the conversion into the three-dimensionally perceptible presentation 113'-115', the graphical object stands out from the original image plane again and the frame of the graphical object is provided with contoured lines that are particularly easily perceptible in three dimensions.

Figure 4C:
Figure 5C:
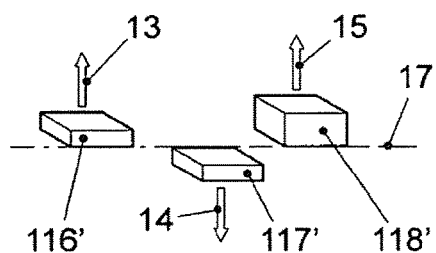

FIG. 4C shows a plurality of linear graphical objects 116-118 on a reference line 17, said graphical objects being altered during the conversion into the three-dimensionally perceptible presentation 116'-118' such that they appear as cuboids on this reference line 17. In this case, the cuboids stand out in different directions; the cuboid 116' is shown with its direction and thickness pulled slightly upward from the reference line 17 in accordance with the direction of animation 13, and the cuboid 118' is altered in the same way, but to a greater extent, in the direction of animation 15. By contrast, the cuboid 117' is shown in lowered form in the opposite direction of animation 14.

Such a presentation is particularly suitable for the visual display of various classes of graphical objects. By way of example, the graphical object 117 is inoperable in the specific situation. In this case, the lowering of the cuboid 117' helps the user to recognize that there is no provision for operation of this graphical object in the given situation. The other objects 116, 118 belong to classes that are operable in the respective situation. In this case, a plurality of classes of these operable objects can be formed, for example by virtue of the object classification being able to include the probability of the user wanting to operate the respective object, or a recommendation by the system that the user should operate the respective object. The high level of animation for the object 118' can indicate to the user that operation using this object in the given situation is now most rewarding, for example.

Figure 4D:
Figure 5D:

FIG. 4D shows a round object in a two-dimensionally perceptible presentation 119, said object appearing as a knob or protruding drop in a three-dimensionally perceptible presentation 119'.

Figure 4E:
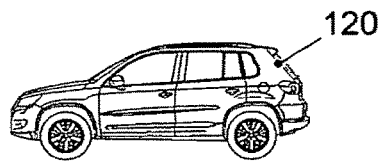
Figure 5E:
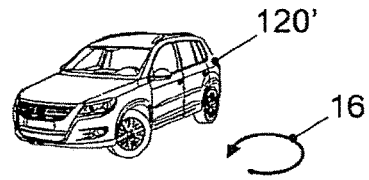

Finally, FIG. 4E shows a graphical object as a two-dimensional presentation 120, said graphical object being animated such that it passes through a plurality of three-dimensionally perceptible presentations 120' of the graphical object in succession as it rotates in space 16, and this not only provides a better perception thereof as a graphical object but also directs the attention of the user to this graphical object as well.

User interfaces having operable graphical objects, what are known as graphical user interfaces, are in widespread use today. Areas of application are computer and consumer electronics and also operator systems for controlling technical appliances, such as electrically, mechanically and/or optically operating machines or automatons for private, commercial or industrial purposes.

Depending on the use environment, a substantial volume of information can arise in this case and, on account of the volume alone or in combination with the additional tasks of the operating user, can make operation confusing.

Modern vehicle information systems provide the vehicle occupants with a wealth of information. This diversity frequently results in long operator operations, however, to find and call the desired function within a complex menu structure. This can particularly result in the driver being distracted if he wishes to call a particular operator function during the journey. It is therefore desirable to provide for use of the various functions of the vehicle and information systems that can be used therein that is fast and simple to execute. For this, the presentation of information and the associated input of operator functions are important.

WO 2006/127378 A1 describes an apparatus for displaying information for various vehicle systems, such as navigation systems or audio systems, in which a defined event prompts a first of two displayed display objects to be visually highlighted to direct the attention of the user thereto. In this case, the other display object can visually recede at the same time. The defined event can be triggered by the system or can be recognized from an operating intention of the user that is sensed by virtue of the user approaching the first display object. The visual highlighting of the first display object may comprise a change of size, color or brightness of this display object, for example.

LIST OF REFERENCE SYMBOLS

1 Vehicle
2 Touchscreen
3 Proximity sensing device
4 Control unit
5 Data bus in the vehicle
6 Functional devices
10 Operating area
11 Finger of the user
12 Direction of operation
13-16 Direction of animation
17 Reference line
100-120 Graphical objects in two-dimensionally perceptible presentation
100'-120' Graphical objects in three-dimensionally perceptible presentation

The invention claimed is:

1. A method for providing a user interface for a driver in a transportation vehicle, the method comprising:
    presenting one or more graphical objects on a display panel having a touch-sensitive surface;
    contactlessly sensing an operating intention of the driver to interact with the display panel in an operating area within the display panel during a journey of the transportation vehicle under the control of the driver, wherein the operating intention is sensed in a space within the operating area within the transportation vehicle;
    calculating three dimensional graphics data for at least one of the graphical objects in the operating area within the display panel;
    in response to the sensed operating intention, during the operation intention sensing, visually differentiating output of the at least one of the graphical objects in the operating area that are operable in a present operating situation from output of the graphical objects in the operating area that are inoperable in the present operating situation by highlighting only the at least one of the graphical objects in the operating area that are operable in the present operating situation, wherein a determination of whether the at least one graphical object is operable is based upon the present operating situation, wherein the visual differentiating is performed by converting the at least one, operable, graphical object from a two-dimensionally perceptible presentation to a three-dimensionally perceptible presentation and displaying the three-dimensionally perceptible presentation of the at least one, operable, graphical object; and
    receiving an indication of an operator action by sensing the driver touching one of the graphical objects on the display panel,
    wherein a plurality of graphical objects in the operating area are each attributed to different classes based on whether the at least one graphical object is operable in the present operating situation, and the visual alteration from the two-dimensionally perceptible presentation to the three-dimensionally perceptible presentation is performed based on the attributed class, and
    wherein based on at least one object being determined inoperable in the operating situation, the at least one inoperable object is visually altered in the operating area so as to appear further away from the driver, wherein there is no provision for operation of the at least one inoperable object in the present operating situation.

2. The method of claim 1, further comprising:
    calculating secondary graphics data for a perspective two-dimensional presentation from the three-dimensionally calculated graphics data; and presenting the at least one, operable, graphical object in two-dimensionally perspective form based on the secondary graphics data.

3. The method of claim 1, wherein
the calculation of the three-dimensional graphics data comprises the calculation of a plurality of stereoscopic views of the at least one, operable, graphical object, and
wherein the at least one, operable, visually highlighted graphical object is presented in stereoscopic form.

4. The method of claim 1, wherein the transition from the two-dimensionally perceptible presentation to the three-dimensionally perceptible presentation of the at least one, operable graphical object takes place in a plurality of intermediate stages.

5. The method of claim 1, wherein the at least one operable, three-dimensionally perceptible presentation is visually altered so as to appear closer to the driver.

6. The method of claim 1, wherein the contactless sensing of the operating intention uses a three-dimensionally resolving proximity sensing unit, a light barrier, and/or using a camera system.

7. The method of claim 1, wherein the graphical objects in the graphical user interface are configured to control executable function of a plurality of functional devices including a navigation appliance, driver assistance systems, infotainment devices, and vehicle comfort devices.

8. An apparatus for providing a user interface for a driver in a transportation vehicle, the apparatus comprising:
a display panel having a touch-sensitive surface for presenting one or more graphical objects and for sensing an operator action of the transportation vehicle driver by virtue of one of the graphical objects being touched;
a sensing device for contactlessly sensing an operating intention of transportation vehicle driver to interact with the display panel in an operating area within the display panel during a journey of the transportation vehicle under the control of the driver; and
a control unit that is connected to the display panel and to the sensing device,
wherein the control unit attributes the operating intention of the driver to a space within the operating area,
calculates three-dimensional graphics data for at least one of the graphical objects in the operating area within the display panel,
in response to the sensed operating intention, as the sensing device senses the operating intention, visually differentiates the output of at least one of the graphical objects in the operating area that are operable in a present operating situation from the output of the graphical objects in the operating area that are inoperable in the present operating situation by highlighting only the at least one of the graphical objects in the operating area that are operable in the present operating situation, wherein a determination of whether the at least one graphical object is operable and whether the at least one graphical object is inoperable is based upon the present operating situation, wherein the visual differentiating is performed by converting the at least one, operable graphical object from a two-dimensionally perceptible presentation to a three-dimensionally perceptible presentation when the operating intention has been sensed and displaying the three dimensionally perceptible presentation of the at least one, operable, graphical object,
wherein a plurality of graphical objects in the operating area are each attributed to different classes based on whether the at least one graphical object is operable in the present operating situation, and the visual alteration from the two-dimensionally perceptible presentation to the three-dimensionally perceptible presentation is performed based on the attributed class, and
wherein based on at least one object being determined inoperable in the operating situation, the at least one inoperable object is visually altered in the operating area so as to appear further away from the driver, wherein there is no provision for operation of the at least one inoperable object in the present operating situation.

9. The apparatus of claim 8, wherein the control unit is further configured to calculate secondary graphics data for a perspective two-dimensional presentation from the three-dimensionally calculated graphics data and present the at least one, operable, graphical object in two-dimensionally perspective form based on the secondary graphics data.

10. The apparatus of claim 8, wherein the calculation of the three-dimensional graphics data comprises the calculation of a plurality of stereoscopic views of the at least one, operable, graphical object, and wherein the at least one, operable, visually highlighted graphical object is presented in stereoscopic form.

11. The apparatus of claim 8, wherein the transition from the two-dimensionally perceptible presentation to the three-dimensionally perceptible presentation of the at least one, operable graphical object takes place in a plurality of intermediate stages.

12. The apparatus of claim 8, wherein the at least one operable, dimensionally perceptible presentation is visually altered so as to appear closer to the driver.

13. The apparatus of claim 8, wherein the sensing device comprises a three-dimensionally resolving proximity sensing unit, a light barrier, and/or using a camera system.

14. The apparatus of claim 8, wherein the graphical objects in the graphical user interface are configured to control executable function of a plurality of functional devices including a navigation appliance, driver assistance systems, infotainment devices, and vehicle comfort devices.

* * * * *